US012746806B1

(12) United States Patent
Gardner

(10) Patent No.: US 12,746,806 B1
(45) Date of Patent: Sep. 29, 2026

(54) SECURITY COVER FOR A VEHICLE

(71) Applicant: Troy Gardner, Norfolk, VA (US)

(72) Inventor: Troy Gardner, Norfolk, VA (US)

( * ) Notice: Subject to any disclaimer, the term of this patent is extended or adjusted under 35 U.S.C. 154(b) by 0 days.

(21) Appl. No.: 19/545,127

(22) Filed: Feb. 20, 2026

Related U.S. Application Data

(60) Provisional application No. 63/917,621, filed on Nov. 14, 2025.

(51) Int. Cl.
*B60J 11/04* (2006.01)
*B60R 25/102* (2013.01)

(52) U.S. Cl.
CPC ............ *B60J 11/04* (2013.01); *B60R 25/102* (2013.01)

(58) Field of Classification Search
CPC ........................................................ B60J 11/04
See application file for complete search history.

(56) References Cited

U.S. PATENT DOCUMENTS

| | | | | | |
|---|---|---|---|---|---|
| 4,222,032 | A * | 9/1980 | Speer | B60R 25/10 | 296/136.03 |
| 5,497,819 | A * | 3/1996 | Chiang | B60J 11/00 | 296/136.01 |
| 5,572,186 | A * | 11/1996 | Traxler | G08B 13/126 | 200/61.18 |
| 5,813,360 | A * | 9/1998 | Dickey, Jr. | B63B 17/02 | 150/166 |
| 10,967,719 | B1 * | 4/2021 | Mellick | B60J 11/04 | |
| 11,491,855 | B2 * | 11/2022 | Huening | B60J 11/04 | |
| 2003/0156018 | A1 * | 8/2003 | Krohn | B62J 19/00 | 340/426.1 |
| 2023/0223896 | A1 * | 7/2023 | Skinner | H02S 30/20 | 136/245 |
| 2025/0319757 | A1 * | 10/2025 | Siltanen | B60J 11/06 | |

FOREIGN PATENT DOCUMENTS

| | | | | |
|---|---|---|---|---|
| CN | 208134052 U * | 11/2018 | B60J 11/04 |
| DE | 10332201 A1 * | 2/2005 | B60J 11/00 |
| DE | 102018131233 A1 * | 6/2019 | B60R 25/00 |
| SE | 516611 C2 * | 2/2002 | B60R 25/016 |

* cited by examiner

*Primary Examiner* — Robert E Fuller

(57) ABSTRACT

A security cover configured to be disposed overlying a vehicle includes a cover assembly having a cover defining a vehicle enclosure. The cover assembly has a cable disposed around a lower perimeter thereof, and a lock having a lock body and a hasp disposable between a locked and an unlocked orientation in a lock compartment. One end of the cable is secured to the lock body and an opposite end of the cable is releasably securable to the lock by the hasp while the hasp is disposed in the locked orientation. The cover assembly has a global positioning system with a global positioning unit in a global positioning unit compartment, and a power source in an electrically communicative relation with the lock and the global positioning unit. A control application is remotely communicative and operative with the lock and the global positioning unit of the cover assembly.

20 Claims, 15 Drawing Sheets

SECURITY COVER FOR A VEHICLE

CROSS-REFERENCE TO RELATED APPLICATION

This application claims priority to U.S. Provisional Patent Application No. 63/917,621 filed Nov. 14, 2025, the entire contents of which are hereby incorporated by reference into this application.

BACKGROUND OF THE INVENTION

A variety of different types of covers have been provided for vehicles including covers for cars, trucks, e.g., a pickup truck, a flatbed truck, a box truck, etc., vans, sport utility vehicles, and the like.

Vehicle covers have evolved alongside the various types of vehicles they protect, beginning with the earliest days of carriage and coach travel. In the 18th and 19th centuries, horse-drawn carriages were often sheltered with heavy canvas or leather coverings to protect them from rain, dust, and sun when not in use. These covers were practical, typically handmade by saddlers or carriage makers using weather-resistant materials which were then utilized in the manufacture of equestrian equipment.

With the rise of the automobile in the late 19th and early 20th centuries, early motorists used simple tarps or fitted cloth covers to shield cars from the elements, especially since many vehicles were stored outdoors and lacked modern paint protection. As car ownership expanded, vehicle covers became more specialized with manufacturers and aftermarket suppliers began offering car covers, often made from treated cotton or wool blends with some designed to fit specific models, to protect finishes, chrome, and interiors.

In the mid-to-late 20th century, advances in materials science transformed vehicle covers. Synthetic fabrics and multi-layer breathable composites improved water resistance while reducing moisture buildup that could lead to unwanted corrosion. More recently, some vehicle covers are highly engineered, offering protection from ultra-violet radiation, temperature regulation, and custom-fit designs for cars, motorcycles, boats, and recreational vehicles. This is indicative of both the technological advances in the vehicles, as well as a growing emphasis on long-term preservation and care.

SUMMARY

A security cover configured to be disposed overlying a vehicle includes a cover assembly having a cover defining a vehicle enclosure. The cover assembly has a cable disposed around a lower perimeter thereof, and a lock having a lock body and a hasp disposable between a locked and an unlocked orientation in a lock compartment. One end of the cable is secured to the lock body and an opposite end of the cable is releasably securable to the lock by the hasp while the hasp is disposed in the locked orientation. The cover assembly has a global positioning system with a global positioning unit in a global positioning unit compartment, and a power source in an electrically communicative relation with the lock and the global positioning unit. A control application is remotely communicative and operative with the lock and the global positioning unit of the cover assembly.

These and other advantages of the invention will be further understood and appreciated by those skilled in the art by reference to the following written specification, claims and appended drawings.

BRIEF DESCRIPTION OF DRAWINGS

Like reference numerals refer to like parts throughout the several views of the drawings.

DETAILED DESCRIPTION

It is to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The present disclosure is directed to a security cover, generally as shown as 100 throughout the figures, configured to be disposed in an overlying relation to a vehicle. The security cover 100 protects a vehicle from a variety of environmental conditions including inclement weather, airborne pollutants, construction debris, inadvertent bumps and scratches, etc. Additionally, the security cover 100 minimizes if not prevents unauthorized access to a vehicle on which the security cover 100 is operatively disposed, thereby deterring theft and/or vandalism. A security cover 100 according to selected embodiments of the current disclosure can be dimensioned and configured to be disposed in an overlying relation to any of a variety of vehicles including, but not limited to, cars, trucks, vans, sport utility vehicles, and the like.

Figure 1:
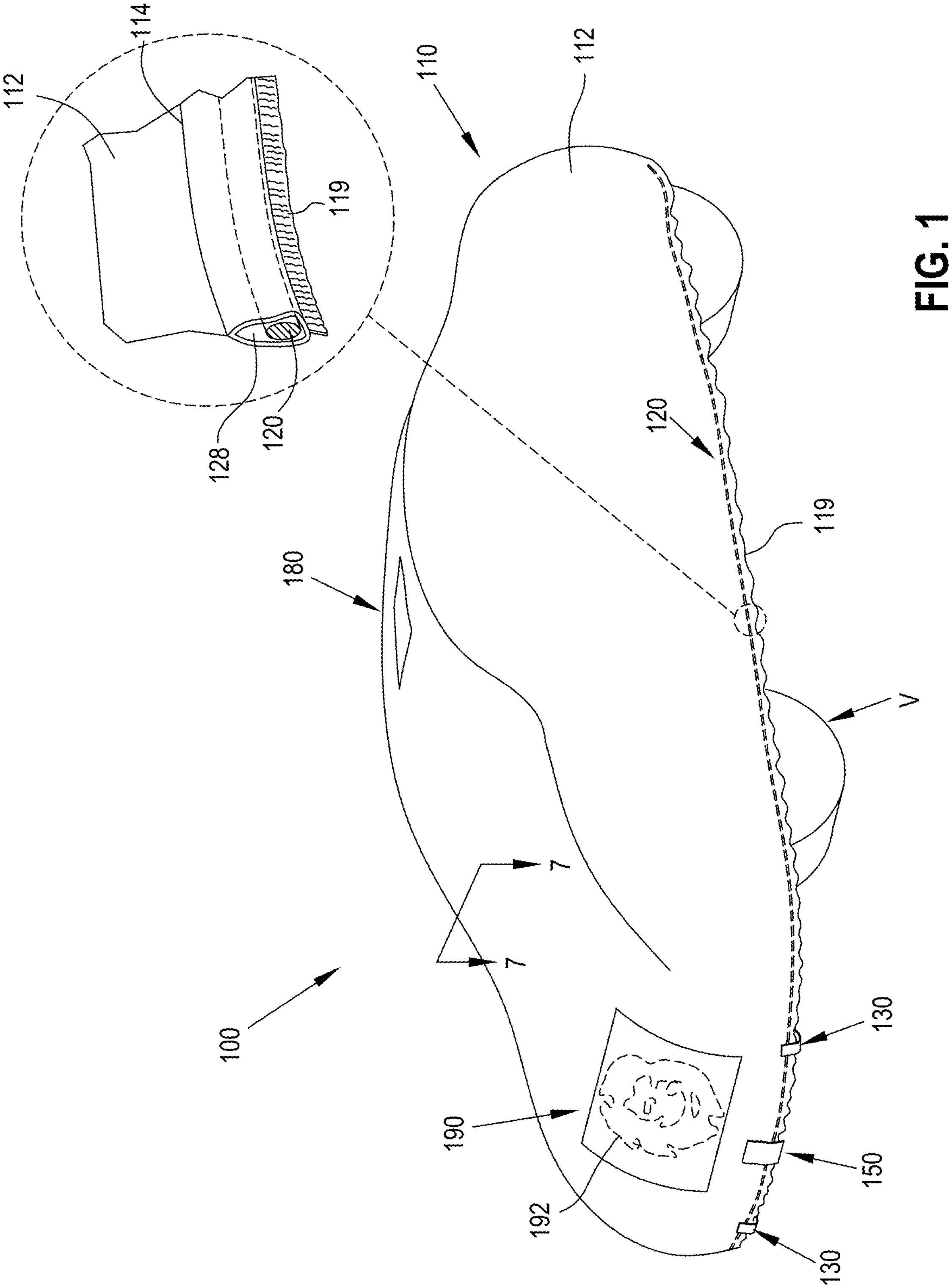
FIG. 1 is a perspective view of a security cover disposed over a vehicle, according to selected embodiments of the current disclosure.
Figure 12:
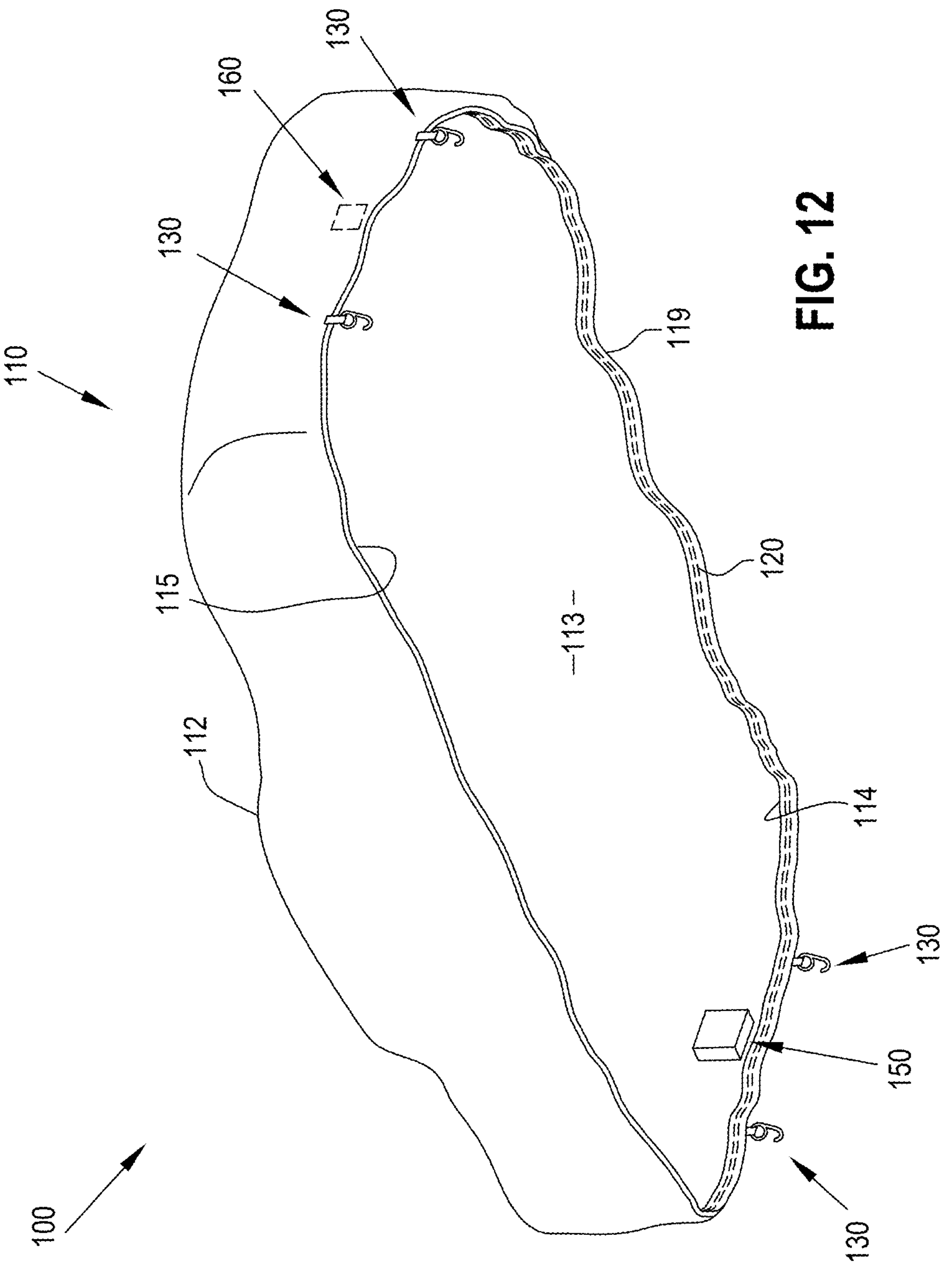
FIG. 12 a bottom perspective view of a security cover, according to selected embodiments of the current disclosure.

FIGS. 1 through 6 present different views of a security cover 100 disposed in an overlying relation to a vehicle V, according to selected embodiments of the current disclosure. With reference initially to FIG. 1, the security cover 100 includes a cover assembly 110 having a cover 112. In some embodiments, the cover 112 defines a vehicle enclosure 113. More particularly, in some embodiments, the cover 112 defines a vehicle enclosure 113 accessible through an enclosure opening 115 which is at least partially delineated by a lower perimeter 114 of the cover 112, such as is shown by way of example in FIG. 12. The vehicle enclosure 113 may be dimensioned and configured to receive any of a variety of vehicles therein, once again, including but not limited to cars, trucks, vans, sport utility vehicles, and the like.

The cover 112 of the cover assembly 110 may have a unitary construction, e.g., the cover 112 may be formed of a single material of construction or a single composite material of construction. By way of example, the cover 112 may be formed of a rigid or semi-rigid material, such as, polycarbonate, acrylonitrile butadiene styrene, aluminum, or a combination thereof. In a further example, the cover 112 may be formed of a flexible or semi-flexible material, such as, polyester, water-resistant polyester fabric, e.g., polyurethane coated polyester, hydrophobic polymers, thermoplastic polyurethane, closed-cell polyethylene, or a combination thereof.

Figure 7:
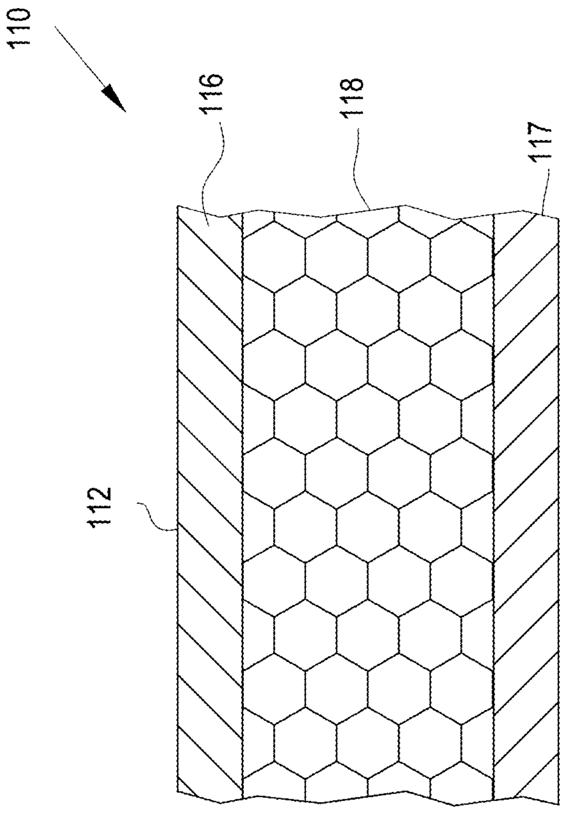
FIG. 7 is a cross-sectional view of a portion of the cover of FIG. 1 along lines 7-7 thereof, according to selected embodiments of the current disclosure.

In some embodiments, the cover 112 includes a multilayered construction having at least an outer layer and an inner layer. In some other embodiments, the cover 112 includes a multi-layered construction having an outer layer 116, an inner layer 117, and an intermediate layer 118 disposed between the outer layer 116 and the inner layer 117. More particularly, FIG. 7 presents a cross-sectional view through a portion of the cover 112 of the cover assembly 110 of FIG. 1 along lines 7-7 thereof, according to selected embodiments of the current disclosure. As may be seen from FIG. 7, in some embodiments, the cover 112 includes the outer layer 116 and the inner layer 117, and the intermediate layer 118 positioned between the outer layer 116 and the inner layer 117.

The outer layer 116 of the cover 112 forms an outer surface which may be exposed to the variety of environmental conditions, as before, including inclement weather, airborne pollutants, construction debris, inadvertent bumps and scratches, etc. As such, the outer layer 116 may be formed of an at least partially weather-resistant or water-resistant material. In some embodiments, the outer layer 116 of the cover 112 is formed of a water-resistant polyester fabric, e.g., polyurethane coated polyester, a hydrophobic polymer, or a combination thereof. In some embodiments, the outer layer 116 includes an anti-graffiti coating.

The inner layer 117 of the cover 112 forms the inner surface of the cover 112, at least portions of which are in direct contact with the finish, e.g., factory paint, custom paint, clear coat, etc., of a body of a vehicle V over which a security cover 100 is disposed, according to selected embodiments of the current disclosure. As such, the inner layer 117 may be formed of a soft, smooth material that is substantially free of abrasions that may damage the finish of the body of the vehicle V. In some embodiments, the inner layer 117 of the cover 112 is formed of a natural fleece, a synthetic fleece, e.g., a synthetic fleece formed of polyester, polyethylene, or polypropylene, a microfiber fabric, e.g., a polyester microfiber fabric, a polyamide microfiber fabric, polyester, polyamide and polypropylene microfiber fabric, or a combination thereof.

As before, the intermediate layer 118 of the cover 112 is disposed between the outer layer 116 and the inner layer 117. The intermediate layer 118 is formed of a cushioning material, according to selected embodiments of the current disclosure. The cushioning material provides a level of impact resistance to the cover 112 of the cover assembly 110 so as to protect the body of the vehicle V from impact damage, such as dents, which may result from contact with adjacent vehicle doors, shopping carts, falling tree limbs, stray game balls, etc. The cushioning material may be formed of a variety of materials including foam, memory foam, silicone, spun fabric, just to name a few. In some embodiments, the cushioning material of the intermediate layer 117 is formed of thermoplastic polyurethane, closed-cell polyethylene, or a combination thereof.

In some embodiments, the intermediate layer 118 includes a cushioning material having a plurality of generally hexagonal shaped sealed air filled cells disposed in a three-dimensional honeycomb array, such as is illustrated by way of example in FIG. 7, wherein the air filled cells are formed of a thermoplastic polyurethane or a closed-cell polyethylene. The three-dimensional honeycomb array provides a uniform pressure distribution such that impact forces are distributed across multiple cells, thereby minimizing impact damage to the body of the vehicle V, as well as to the intermediate layer 118 itself. The three-dimensional honeycomb array may be formed by processing sheets of polymer film, e.g., sheets of a thermoplastic polyurethane film or a closed-cell polyethylene film, through a roller system that thermally forms generally hexagonal shaped air filled micro-domes in the surface of the films. The micro-domes are then individually sealed to prevent air-leakage and/or collapse.

The intermediate layer 118 of the cover 112 may be secured to the outer layer 117 of the cover 112 by any of a variety of attachments including, but in no manner limited to, adhesives, thermos-welding, stitching, mechanical fasteners, etc. Similarly, the intermediate layer 118 may be secured to the inner layer 117 by any of a variety of attachments, once again, including, but in no manner limited to, adhesives, thermos-welding, stitching, mechanical fasteners, etc.

With reference again to FIG. 1, the cover assembly 110 of the security cover 100 includes a cable 120 disposed around the lower perimeter 114 of the cover 112. In some embodiments, the cable 120 extends substantially continuously around the cover 112 proximate the lower perimeter 114 thereof, such as is shown in FIGS. 1 through 4, collectively. The cable 120 may be constructed of any of a variety of semi-rigid to semi-flexible materials including, but in no manner limited to, aluminum, steel, metal alloys, braided steel, braided metal alloys, nylon, polyvinyl chloride, polyethylene, polypropylene, fluoropolymers, thermoplastics, naturally occurring fibers, synthetic fibers, or a combination thereof. In some embodiments, the cable 120 has a diameter of from about 1/16 inch to about 1/4 inch. The cable 120 may exhibit a break strength in a range of from about 500 pounds to about 15,000 pounds. The cable 120 has an elongated configuration having oppositely disposed ends thereof, according to selected embodiments of the current disclosure.

In some embodiments, the cover assembly 110 includes a cable retention channel 128 disposed around the cover 112 proximate the lower perimeter 114 thereof, such as is shown by way of example in the inset in FIG. 1. More particularly, the cable 120 extends through the cable retention channel 128 around and along the lower perimeter 114 of the cover 112 of the cover assembly 110. The cable retention channel 128 may be attached proximate the lower perimeter 114 of the cover 112 by any of a variety of attachment mechanisms including, but in no manner limited to, adhesives, thermos-welding, stitching, mechanical fasteners, etc.

In some embodiments, the cable retention channel 128 has oppositely disposed open ends 129 each communicative with a different one of corresponding cable apertures 155 in a lock compartment 150, as disclosed and described in detail hereinafter. This arraignment allows the oppositely disposed ends of the cable 120 to operatively engage with a lock 140 in the lock compartment 150, also disclosed and described in detail hereinafter.

The cover assembly 110 may include a biasing mechanism 119 disposed proximate the lower perimeter 114 of the cover 112. The biasing mechanism 119 is configured to pull one or more portions of the cover 112 under a chassis VC of the vehicle V while the security cover 100 is disposed thereon, such as is shown by way of example in FIG. 6. With reference again to FIG. 1, and more particularly, the inset of FIG. 1, in some embodiments, the biasing mechanism 119 is attached to the cable retention channel 128 proximate the lower perimeter 114 of the cover 112. The biasing mechanism 119 may be formed of an elastic, semi-elastic, resilient or semi-resilient material. In some embodiments, the biasing mechanism 119 may include a plurality of discreet sections or segments attached to select portions of the cover 112, such as proximate the front and rear corners of the cover 112. In some embodiments, the biasing mechanism 119 is disposed substantially continuously around and along the cover 112 proximate the lower perimeter 114 thereof, as shown in FIGS. 1 through 4, collectively.

The cover assembly 110 may include an anchor device 130 configured to maintain or hold the cover 112 in position while the security cover 100 is disposed in an overlying relation to a vehicle V. In some embodiments, the cover assembly 110 includes a plurality of anchor devices 130 each having an anchor member 132 affixed to the cover 112 proximate the lower perimeter 114 thereof, such as via a corresponding anchor interconnect 134. The anchor member(s) 132 have a generally open hook configuration dimensioned to be readily and releasably attachable to a portion of a chassis VC of the vehicle V to hold the security cover 100 in position on the vehicle V while the security cover 100 is disposed in an overlying relation thereto. In some embodiments, the cover assembly 110 includes a pair of anchor devices 130 attached to each of the front and rear of the cover 112, wherein each of the anchor devices 130 includes an anchor member 132 configured to releasably attach the cover 112 to the chassis VC of the vehicle V, as shown by way of example in FIG. 6. With continued reference to FIG. 6, and more particularly, the inset in FIG. 6, the anchor member 132 of the anchor device 130 is attached proximate the lower perimeter 114 of the cover 112 via anchor interconnect 134. The anchor member 132 may be formed of any of a number of a rigid materials including, but in no manner limited to, metals, metal alloys, thermoplastics, or a combination thereof. The anchor interconnect 134 may be formed of a semi-rigid material including, but in no manner limited to, woven fabric, non-woven fabric, high-density polyethylene, polyester, polypropylene, or a combination thereof.

Figure 8:
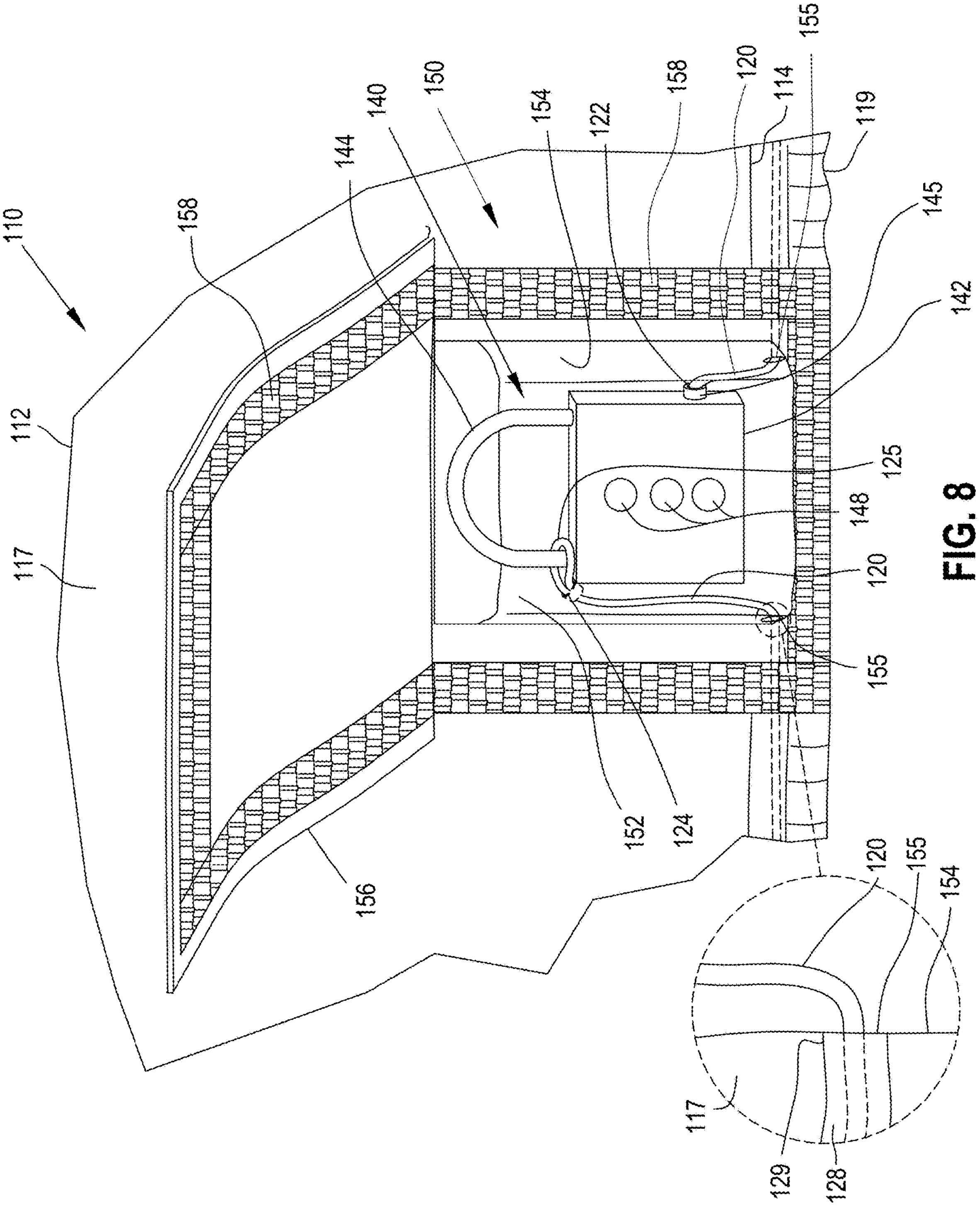
FIG. 8 is a perspective view of a lock disposed in a lock compartment, according to selected embodiments of the current disclosure.
Figure 9:
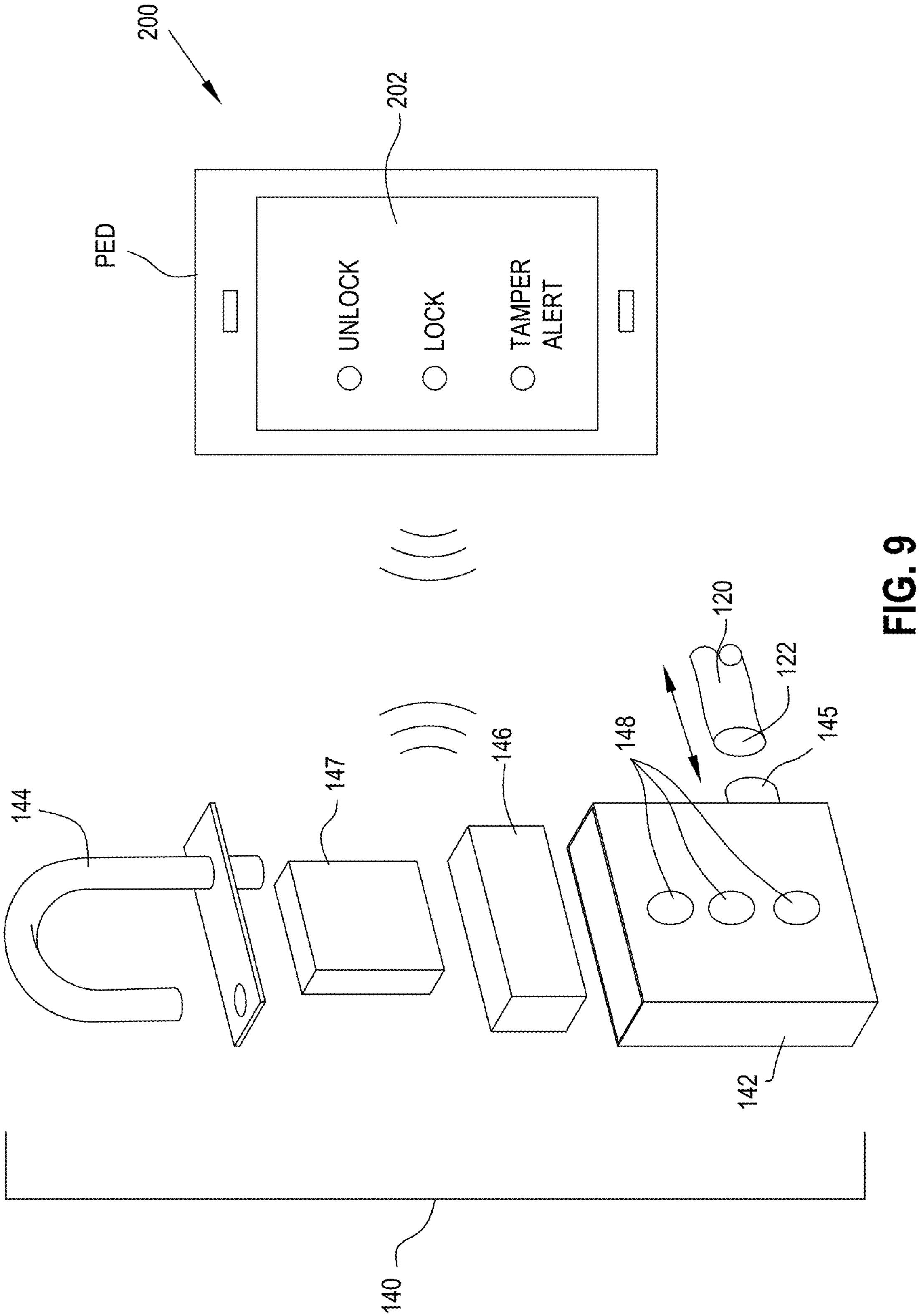
FIG. 9 is a partially exploded perspective view of a lock, according to selected embodiments of the current disclosure.

As before, the security cover 100 in accordance with embodiments of the current disclosure includes a lock 140 disposed in a lock compartment 150, as shown by way of example in FIG. 8. With reference to FIG. 9, a partially exploded perspective view of a lock 140 is presented, according to selected embodiments of the current disclosure. The lock 140 includes a lock body 142 and a hasp 144, wherein the hasp 144 is disposable between a locked orientation and an unlocked orientation relative to the lock body 142. The lock body 142 includes a cable interconnect 145 disposed on a portion thereof, the cable interconnect 145 is configured such that one of the oppositely disposed ends of the cable 120, for example, a fixed end 122 of the cable 120, may be securely attached to the lock body 142 of the lock 140. The fixed end 122 of the cable 120 may be securely attached to the cable interconnect 145 of the lock body 142 by any of a number of attachments including, but in no manner limited to, adhesives, welding, soldering, thermo-welding, mechanical fasteners, or a combination thereof. Further, in some embodiments, the opposite end of the cable 120, e.g., a free end 124 of the cable 120, includes a lock interconnect 125 formed thereon, wherein the lock interconnect is configured as a closed loop dimensioned to receive a portion of the hasp 144 of the lock 140 therethrough. More particularly, the opposite end of the cable 120, e.g., the free end 124 of the cable 120, is releasably securable to the lock 140 by the hasp 144 while the hasp 144 is disposed through the lock interconnect 125 on the free end 124 of the cable 120 and the hasp 144 is disposed in the locked orientation, such as is shown by way of example in FIG. 8.

Also shown in FIG. 8, the lock compartment 150 is dimensioned and configured to receive the lock 140 therein. The lock compartment 150 includes a rear wall 152 and side walls 154. In some embodiments, the side walls 154 of the lock compartment 150 include cable apertures 155 formed therethrough. More particularly, in some embodiments, the side walls 154 of the lock compartment 150 include cable apertures 155 formed throughout wherein the cable apertures 155 are dimensioned and configured to receive a different one of the oppositely disposed ends of the cable 120, e.g., the fixed end 122 and the free end 124 of the cable 120, therethrough. As will be appreciated by one skilled in the art, it is within the scope and intent of the current disclosure for one or more cable apertures 155 to be formed through one or more of the rear wall 152 or the upper or lower walls of the lock compartment 150.

With continued reference to FIG. 8, and more particularly the inset in FIG. 8, and as before, the cable retention channel 128 has oppositely disposed open ends 129 each of which communicates with a different one of the cable apertures 155 through the walls of the lock compartment 150, e.g., through the side walls 154. As such, the oppositely disposed ends of the cable 120, e.g., the fixed end 122 and the free end 124 of the cable 120, may be received into the lock compartment 150 for secure engagement with the lock 140 therein. More particularly, and as before, the fixed end 122 of the cable 120 may be securely attached to the lock body 142 via the cable interconnect 145 and the free end 124 of the cable 120 may be releasably secured to the lock 140 by way of the hasp 144 disposed through the lock interconnect 125 thereof and the hasp 144 being disposed into a locked orientation relative to the lock 140, once again, as shown by way of example in FIG. 8.

Figure 6:
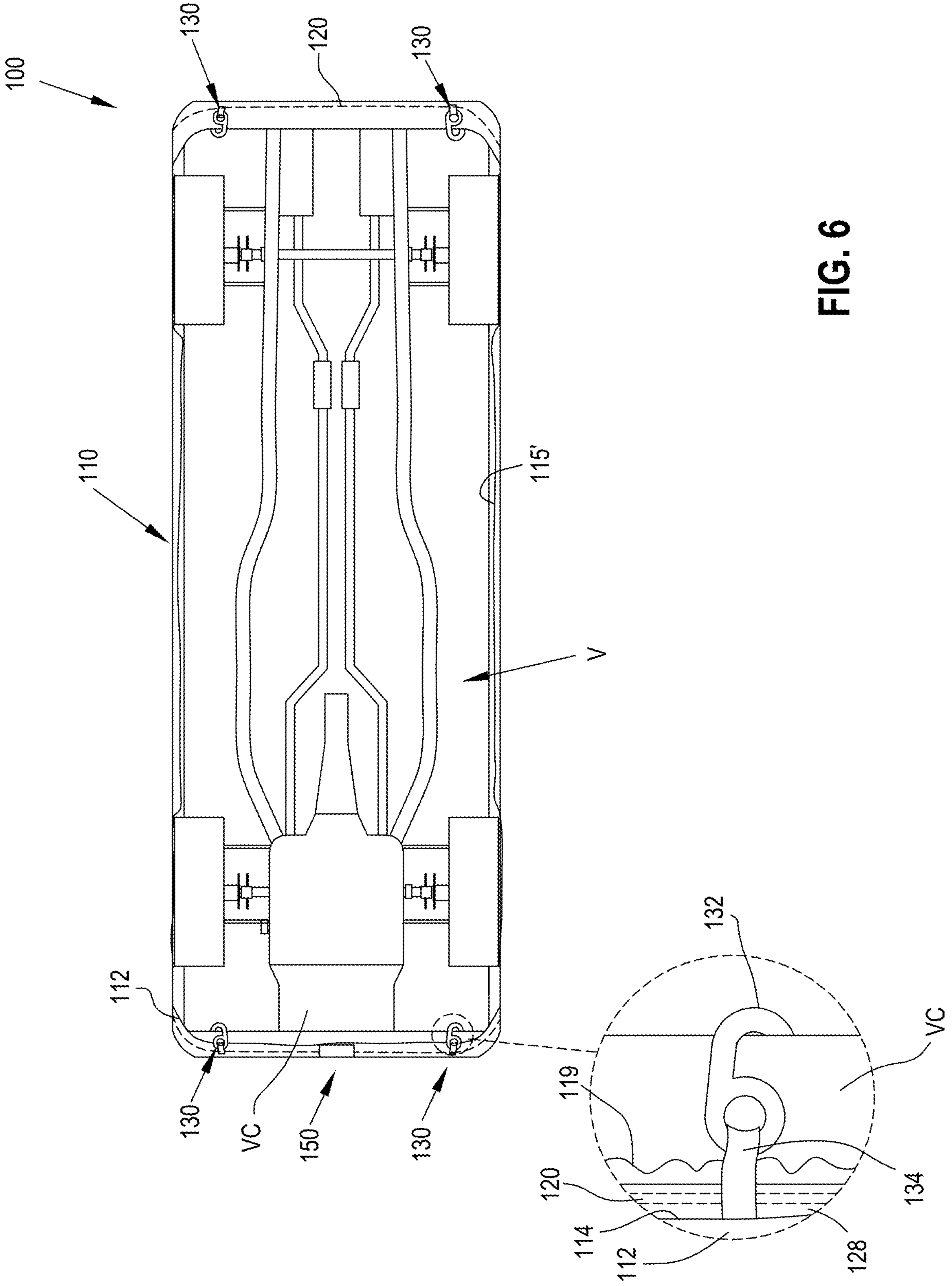
FIG. 6 is a bottom plan view of the security cover of FIG. 1 disposed over the vehicle, according to selected embodiments of the current disclosure.

In operation, the cover 112 of the cover assembly 110 of the security cover 100 is positioned in an overlying relation to the vehicle V, and the free end 124 of the cable is pulled taught such that portions of the cover 120 are pulled underneath the chassis VC of the vehicle V, as shown by way of example in FIG. 6, and the free end 124 of the cable 120 is releasably secured to the lock 140 by disposing a portion of the hasp 144 through the lock interconnect 125 and disposing the hasp 144 into the locked orientation relative to the lock 140. As will be appreciated from FIG. 6, in this locked orientation, removal of the security cover 100 from the vehicle V is significantly impended, if not prevented altogether, by virtue of the portions of the cover 112 of the cover assembly 110 being pulled under the chassis VC of the vehicle. Stated otherwise, while the cable 120 is releasably secured by the lock 140 in the lock compartment 150, the enclosure opening 115', as shown in FIG. 6, is considerably reduced as compared to the enclosure opening 115 while the cable 120 is disposed in a released orientation, such as is shown by way of example in FIG. 12, such that unimpeded removal of the cover 112 of the cover assembly 100 from the vehicle Vis no longer possible.

With reference again to FIG. 9, in accordance with some embodiments of the current disclosure, the lock 140 includes a lock transceiver 146. The lock transceiver 146 is communicative with a plurality of status indicators 148 on the lock 140 which provides a visual signal, an audible signal, or both, to indicate a status of the lock 140 to a user, for example, an indication that the lock 140 is in a locked configuration or an unlocked configuration.

In some embodiments, the lock transceiver 146 is communicative with a control application 200, such as may be supported on a computer, a laptop, or portable electronic device PED. The lock transceiver 146 may be configured to communicate with the control application 200 remotely, such as, by way of example, via WI-FI™, BLUETOOTH™, or another remote communication pathway. In some embodiments, the lock transceiver 146 is configured to transmit a lock status signal to the control application 200 which displays a lock status on a lock display 202 of the control application 200, such as, on the portable electronic device PED, such as is shown by way of example in FIG. 8. The lock status displayed on the lock display 202 may include an indication of the lock 140 being disposed in a locked configuration or an unlocked configuration. In at least one embodiment, the control application 200 is utilized to remotely operate the lock 140, and more particularly, the hasp 144 of the lock 140, causing the hasp 144 to move from a locked orientation to an unlocked orientation, or vice versa.

The lock 140 may also include a tamper sensor 147 configured to detect a predetermined movement of the lock 140 such as may be indicative of an unauthorized attempt to open the lock 140. More particularly, the predetermined movement may include rotation of the lock body 142 of the lock 140 to the right or left by a predetermined angle, for example, from about 1 degree to about 180 degrees, such as from about 5 degrees to about 180 degree, or from about 15 degrees to about 180 degrees, or from about 30 degrees to about 180 degrees. The predetermined amount of movement may additionally or alternatively include rotation of the lock body 142 of the lock 140 forward or rearward by a predetermined angle, for example, from about 1 degree to about 180 degrees, such as from about 5 degrees to about 180 degree, or from about 15 degrees to about 180 degrees, or from about 30 degrees to about 180 degrees.

The tamper sensor 147 may be communicative with the plurality of status indicators 148 on the lock 140 and is configured to generate and communicate a tamper alert signal thereto upon detection of a predetermined movement of the lock 140 causing the status indicators 148 to generate an alarm including a visual signal, an audible signal, or both, to serve as a deterrent to a potential unauthorized attempt to open the lock 140. In some embodiments, the tamper sensor 147 is disposed in communication with the lock transceiver 146 and is configured to generate and communicate a tamper alert signal thereto upon detection of a predetermined movement of the lock 140, and the lock transceiver 146 is configured to transmit the tamper alert signal to the control application 200 which displays a tamper alert on the lock display 202 of the control application 200, such as on the portable electronic device PED, to alert a user of a potential unauthorized attempt to open the lock 140, so that the user can take appropriate mitigating action.

Looking again to FIG. 8, the lock compartment 150 includes a lock compartment cover 156 which is dimensioned to overly the interior of lock compartment 150 while the lock 140 is operatively disposed therein. The lock compartment 150 and/or lock compartment cover 156 may be constructed of the same material as the cover 112, for example, the same material as the outer layer 116 of the cover 112. Alternatively, the lock compartment 150 and/or lock compartment cover 156 may be constructed of a material that is different than the cover 112. In some embodiments, the lock compartment cover 156 is formed of a water-resistant polyester fabric, e.g., polyurethane coated polyester, a hydrophobic polymer, or a combination thereof, according to selected embodiments of the current disclosure, in order to protect the lock 140 from the elements including rain, sleet, snow, etc., while the lock 140 is disposed in the lock compartment 150.

Figure 2:
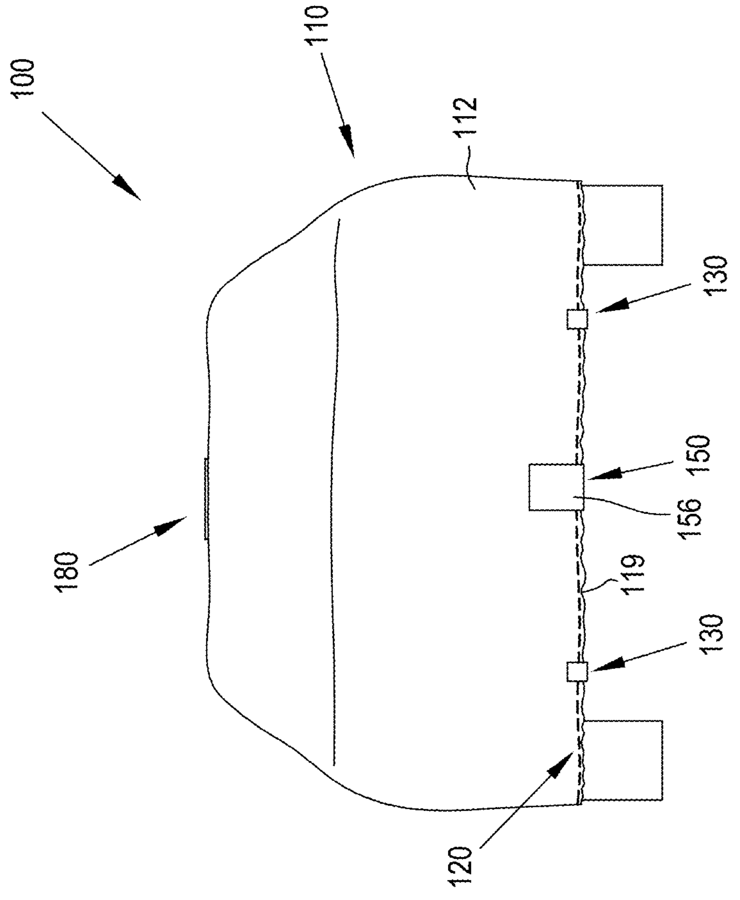
FIG. 2 is a front elevation of the security cover of FIG. 1 disposed over the vehicle, according to selected embodiments of the current disclosure.
Figure 3:
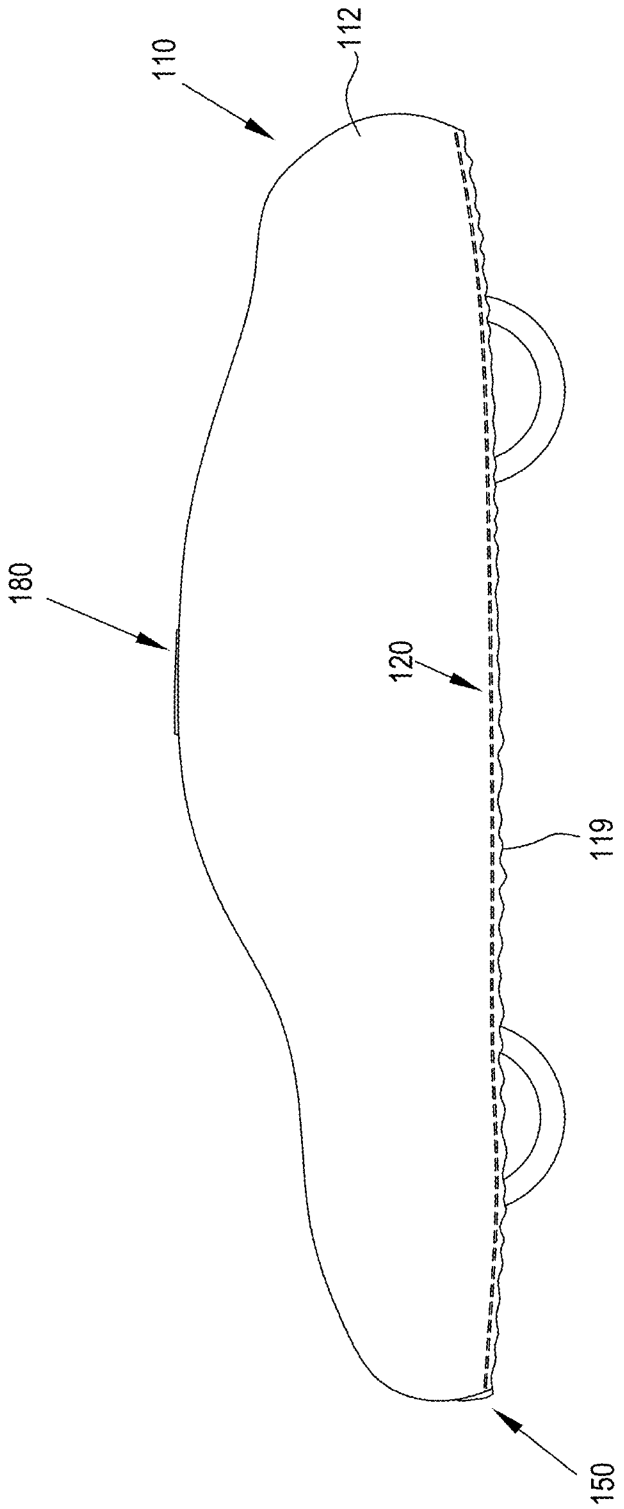
FIG. 3 is a side elevation of the security cover of FIG. 1 disposed over the vehicle, according to selected embodiments of the current disclosure.
Figure 4:
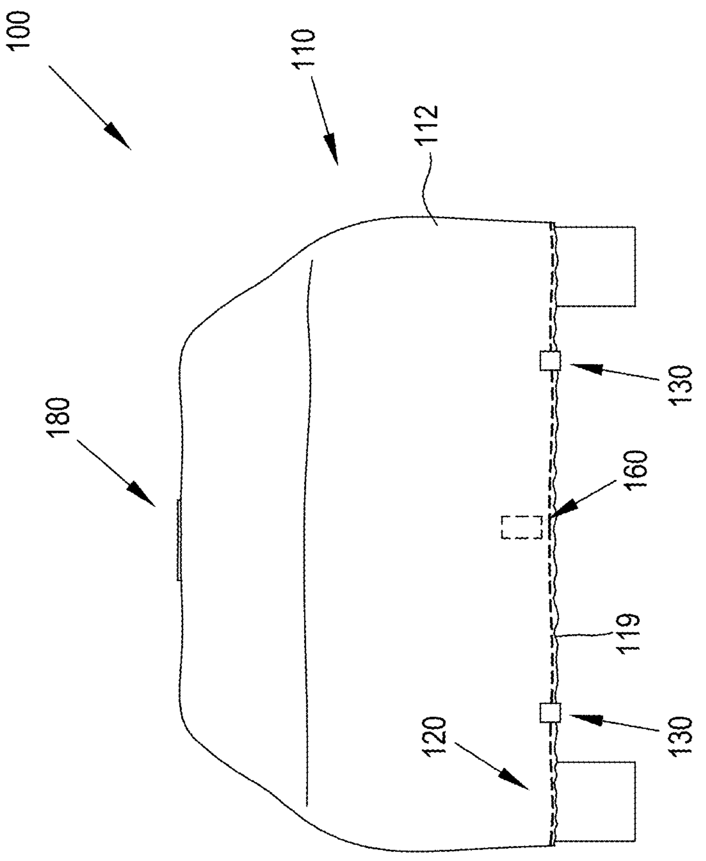
FIG. 4 is a rear elevation of the security cover of FIG. 1 disposed over the vehicle, according to selected embodiments of the current disclosure.

A lock compartment closure 158 is provided to allow the lock compartment cover 156 to be disposable between a closed overlying relation to the interior of the lock compartment 150, as shown by way of example in FIG. 2, and an open configuration to allow access to the cable 120 and lock 140 within the lock compartment 150, as shown by way of example in FIG. 8. The lock compartment closure 158 may include any of a variety of closures including snaps, zippers, buttons, or a combination thereof. In some embodiments, the lock compartment closure 158 includes complimentary hook and loop type fasteners disposed on portions of the underside of the lock compartment cover 156 and around the outer perimeter of the lock compartment 150 itself, as shown by way of example in FIG. 8.

The security cover 100, according to selected embodiments of the current disclosure, also includes a global position system 160. More particularly, the global positing system 160 includes a global positioning unit 162 configured to remotely communicate with a network of geo-positioning satellites and to determine the precise coordinates, e.g., longitude and latitude, of the global positioning unit 162, such the precise location of the security cover 100 corresponding to the global positioning unit 162 may be determined at any given time.

In addition, the global positioning unit 162 is communicative with the control application 200 via a global positioning unit transceiver 164. The global positioning unit transceiver 164 may be configured to communicate with the control application 200 remotely, such as, by way of example, via WI-FI™, BLUETOOTH™, or other remote communication pathways. In some embodiments, the global positioning unit transceiver 164 is configured to transmit a location signal to the control application 200 which displays a location map having a location indicator 205 thereon corresponding to a location, e.g., a current location, of the global positioning unit 162 on a global positioning system display 204 of the control application 200, such as is shown by way of example in FIG. 10.

As such, a user can periodically monitor the location of the global positioning unit 162, and thus, the location of the corresponding security cover 100. The control application 200 may be programmed to generate an alert, including an audible and/or visual signal transmitted by way of the global positioning system display 204 of the control application 200 on the portable electronic device PED, in the event the location of the global positioning unit 162 changes by a preset distance. The preset distance can be, by way of example only, from about 1 foot to about 10 feet, or from about 1 foot to about 100 feet, or from about 1 foot to about 1,000 feet.

The security cover 100 may include a global positioning unit compartment 170 dimensioned and configured to receive the global positioning unit 162 of the global positioning system 160 therein. In some embodiments, the security cover 100 includes a global positioning compartment 170 affixed to a portion of the inner layer 117 of the cover 112, as shown by way of example in FIG. 10. As such, the global positioning unit compartment 170, and thus, the global positioning device unit 162 therein, are not readily accessible while the security cover 100 is disposed in an overlying relation to a vehicle V to minimize if not eliminate unauthorized access to the global positioning unit 162.

In some embodiments, the global positioning compartment 170 includes a global positioning unit compartment opening 172 dimensioned and configured to receive the global positioning unit 162 therethrough into and out of the global positioning unit compartment 170 as may be needed from time to time for maintenance or repair. The global positioning compartment 170 also includes a global positioning unit compartment cover 174 configured to overly the global positioning unit compartment opening 172 until access to the global positioning unit compartment 170 is needed.

Figure 10:
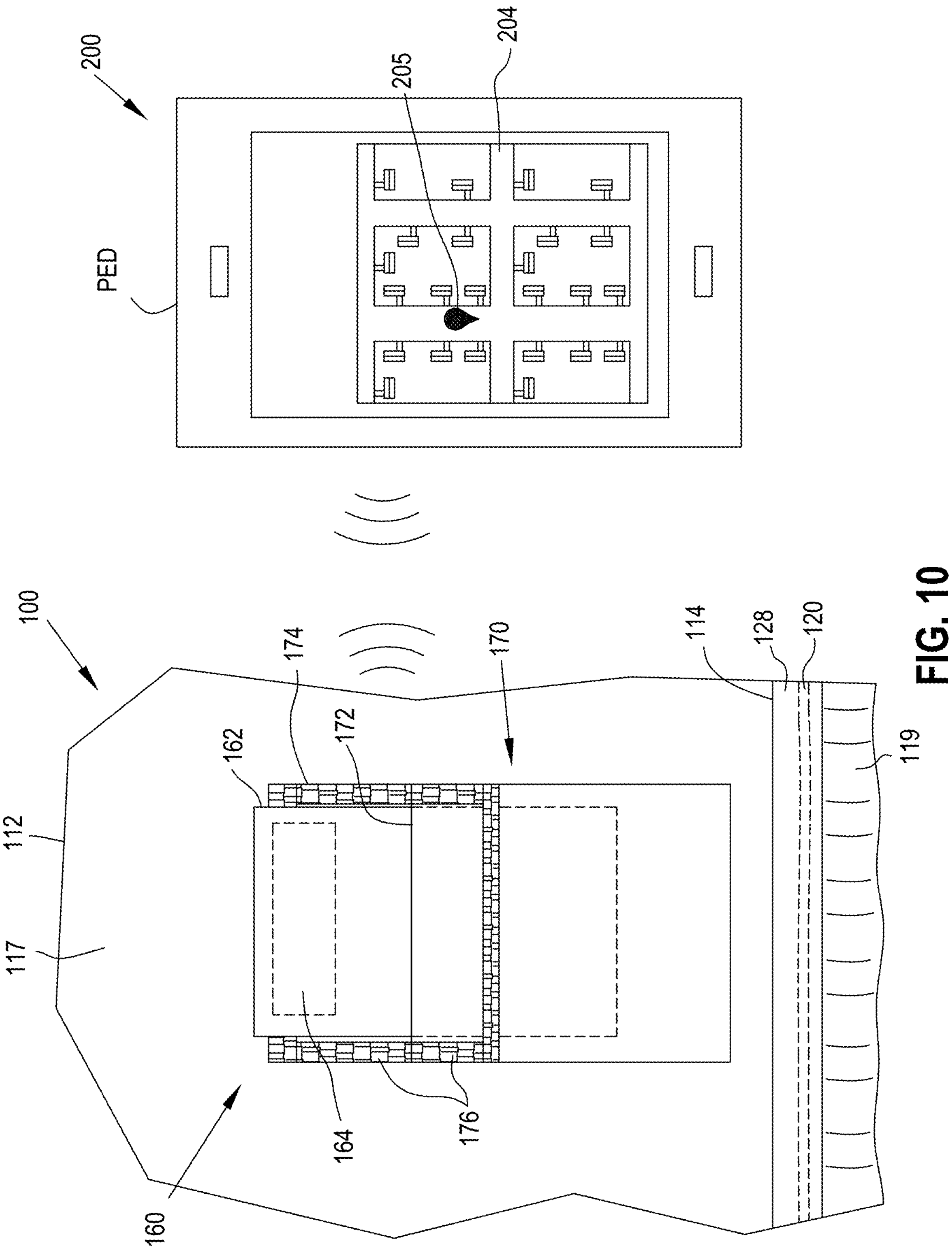
FIG. 10 is a perspective view of a global positioning system having a global positioning unit disposed in a global positioning unit compartment, according to selected embodiments of the current disclosure.

Similar to the lock compartment closure 158 of the lock compartment cover 156, a global positioning unit compartment closure 176 may be provided to allow the global positioning unit compartment cover 174 to be disposed between a closed overlying relation to the global positioning unit compartment opening 172 and on open configuration to allow access to the global positioning unit 162 disposed in the global positioning unit compartment 170, as shown by way of example in FIG. 10. The global positioning unit compartment closure 176 may include any of a variety of closures including snaps, zippers, buttons, or a combination thereof. In some embodiments, the global positioning unit compartment closure 176 includes complimentary hook and loop type fasteners disposed around portions of the underside of the global positioning unit compartment cover 174 and portions of the global positioning unit compartment 170 itself, as shown by way of example in FIG. 10.

Figure 5:
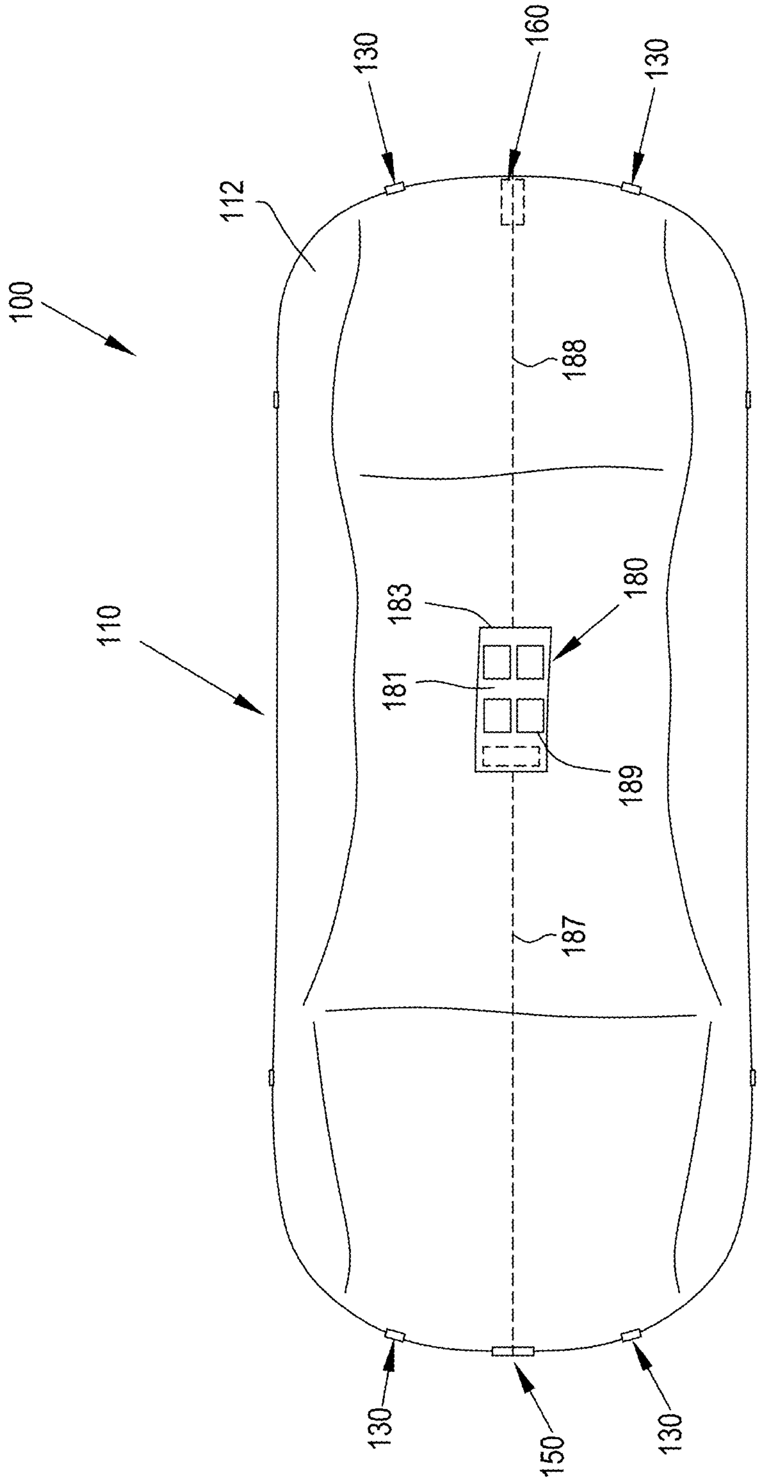
FIG. 5 is a top plan view of the security cover of FIG. 1 disposed over the vehicle, according to selected embodiments of the current disclosure.

In some embodiments, the security cover 100 includes a power source 180. More particularly, according to selected embodiments of the current disclosure, the security cover 100 includes a power source 180 configured to supply electrical power for operation of the lock 140 and/or the global positioning unit 162 of the global positioning system 160. With reference to FIG. 5, in some embodiments, the security cover 100 includes a lock charging pathway 187 operative to transmit electrical power from the power source 180 to the lock 140 in the lock compartment 150, to facilitate operation of the lock 140. With continued reference to FIG. 5, in some embodiments, the security cover 100 includes a global positioning system charging pathway 188 operative to transmit electrical power from the power source 180 to the global positioning system 160 to facilitate operation of the global positioning unit 162 thereof. The lock charging pathway 187 and the global positioning system charging pathway 188 may include hard-wired electrical connectivity, wireless inductive electrical connectivity, or a combination thereof.

The power source 180 may include, but is in no manner limited to, a single use dry cell battery, a rechargeable dry cell battery, e.g., a lithium-ion battery, a nickel-cadmium battery, or a nickel-metal hydride battery, a rechargeable power bank, a car charger/inverter, or a combination thereof. In some embodiments, the power source 180 includes a solar collector 189 having one or more solar collector panels, as shown by way of example in FIG. 11, configured to convert sunlight into usable electrical energy. The solar collector 189 may be constructed so as to present a relatively thin profile, and in some embodiments, the solar collector 189 may be constructed of an at least partially flexible material.

The power source 180, according to selected embodiments of the current disclosure, includes a power source transceiver 182. In some embodiments, the power source transceiver 182 is communicative with the control application 200, such as is shown by way of example in FIG. 11. The power source transceiver 182 may be configured to communicate with the control application remotely, such as, by way of example, via WI-FI™, BLUETOOTH™, or other remote communication pathways. In some embodiments, the power source transceiver 182 is configured to transmit a power source status signal to the control application 200 which displays a power source status on a power source display 206 of the control application 200, such as, on a portable electronic device PED. The power source status displayed on the power source display 206 can include an indication of the power source 180 disposed in a charged state, or an indication of the power source 180 disposed in a changing state. The power source display 206 may include an indication of the level of charge remaining for the power source 180 such as may be expressed, for example, as a percentage of charge remaining, an amount of time until discharged, or a combination thereof.

The security cover 100 may include a power source compartment 183 dimensioned and configured to receive the power source 180 therein. Similar to the global positioning unit compartment 170, in some embodiments, the security cover 100 includes a power source compartment 183 affixed to a portion of the inner layer 117 of the cover 112, such as is shown by way of example in FIG. 11. As such, the power source compartment 183, and thus, the power source 180 therein, are not readily accessible while the security cover 100 is disposed in an overlying relation to a vehicle V to minimize if not prevent unauthorized access to the power source. In embodiments in which the power source 180 includes a solar collector 189, at least an outwardly facing side 181 of the power source compartment 183 is formed of a transparent or translucent material of construction so as to permit exposure of the solar panel(s) of the solar collector 189 to the rays of the sun, as shown by way of example in FIG. 5.

In some embodiments, the power source compartment 183 includes a power source compartment opening 184 dimensioned and configured to receive the power source 180 therethrough into and out sf the power source compartment 183 as may be needed from time to time for replacement, recharging, maintenance or repair. The power source compartment 183 also includes a power source compartment cover 185 configured to overly the power source compartment opening 184 until access to the power source compartment 183 is needed.

Figure 11:
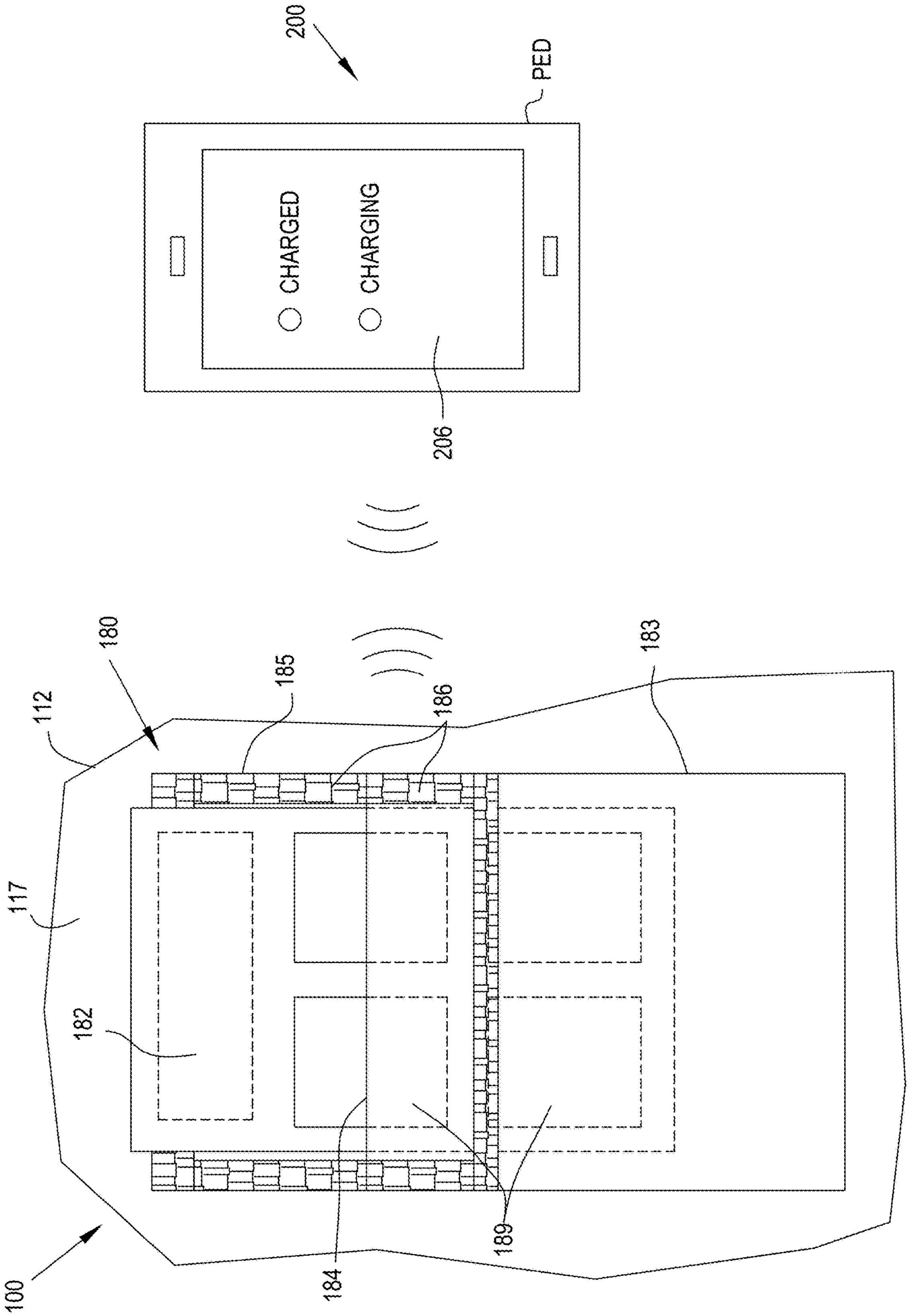
FIG. 11 is a perspective view of a power source disposed in a power source compartment, according to selected embodiments of the current disclosure.

Similar to the lock compartment closure 158 of the lock compartment cover 156 and the global positioning unit compartment closure 176 of the global positioning unit compartment cover 174, a power source compartment closure 186 may be provided to allow the power source compartment cover 185 to be disposed between a closed overlying relation to the power source compartment opening 184 and on open configuration to allow access to the power source 180 within the power source compartment 183, as shown by way of example in FIG. 11. The power source compartment closure 186 may include any of a variety of closures including snaps, zippers, buttons, or a combination thereof. In some embodiments, the power source compartment closure 186 includes complimentary hook and loop type fasteners disposed around the underside of the power source compartment cover 185 and portions of the power source compartment 183 itself, as shown by way of example in FIG. 11.

In some embodiments, the security cover 100 includes an indicia display region 190 disposed on a portion of the outer layer 116 of the cover 112 thereof. The indicia display region 190 is dimensioned and configured to receive at least one indica 192 to be displayed therein, such as is shown by way of example in FIG. 1. The indicia 192 can include, but is in no manner limited to, logos, symbols, pictures, graphic elements, text, or a combination thereof. In some embodiments, the security cover 100 may have a plurality of indicia display regions 190 disposed on different portions, e.g., a hood portion, a trunk portion, a side portion, of the outer layer 116 of a cover 112. In other embodiments, the indicia display region 190 may encompass the outer layer 116 of the cover 112 of the cover assembly 110 in its entirety.

The indicia 192 is permanently applied to the outer layer 116 of the cover 112, according to selected embodiments of the current disclosure. More particularly, in some embodiments, the indicia 192 is applied to the cover by laser engraving, chemical etching, ultra-violet cured ink, or a combination thereof. The indicia 192 is applied to the cover 112 in a manner such that the indicia 192 is tamper-resistant, as well as being resistant to wear and fading, thereby providing for long-term visibility of the indicia 192. In some embodiments, the indicia 192 may include a serial number, a bar code, a quick-response code, or other such identifier such that each security cover 100 may be uniquely identified in the event of theft, damage, e.g., fire, etc.

Figure 13:
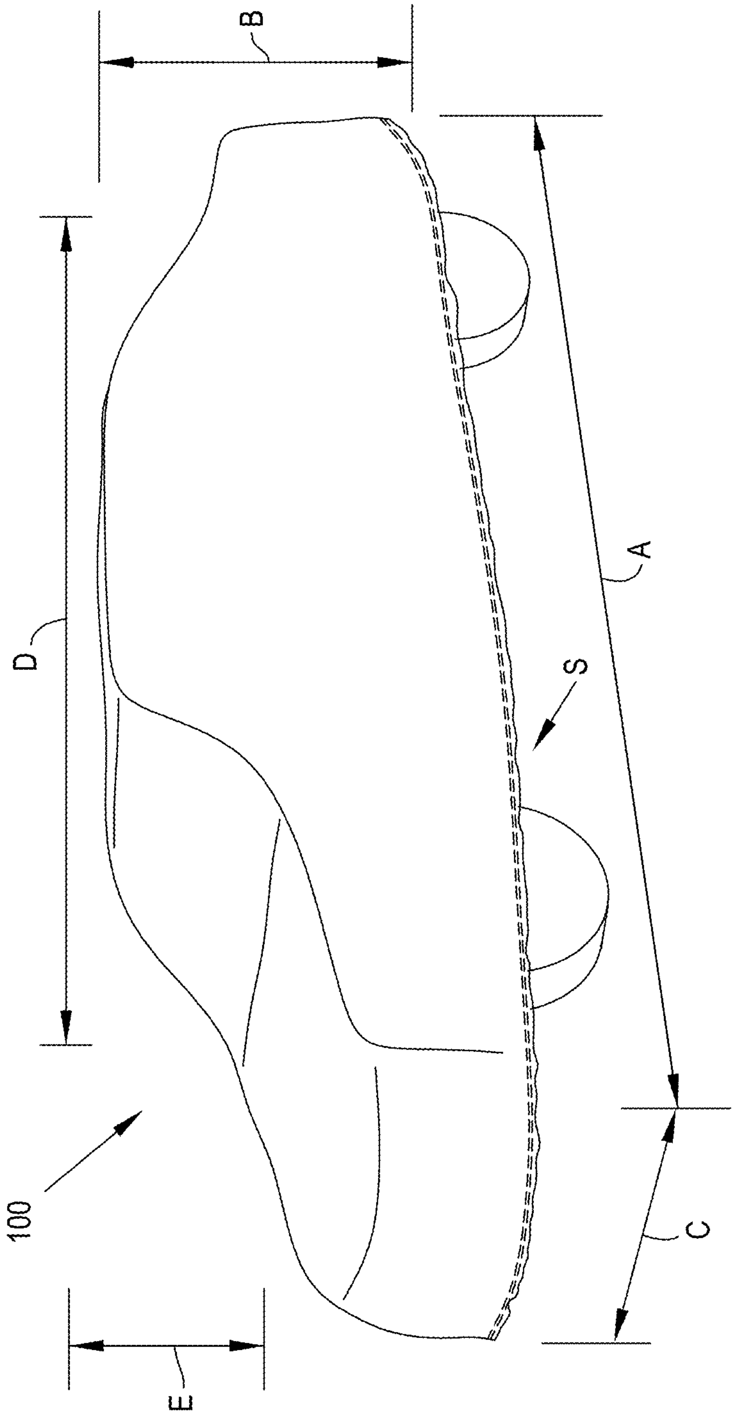
FIG. 13 is a perspective view of a security cover disposed over an exemplary sedan including representative dimension lines, according to selected embodiments of the current disclosure.

Looking next to FIG. 13, presented therein is a perspective view of a security cover 100 disposed over an exemplary sedan S including representative dimension lines A-E, according to selected embodiments of the current disclosure. In some embodiments, the security cover 100 for an exemplary sedan S has a length A of from about 12 feet to about 18 feet, a height B of from about 4 feet to about 6 feet, and a width C of from about 4 feet to about 6 feet. As also shown in FIG. 13, in some embodiments, the security cover 100 for an exemplary sedan S has a cab portion length D of from about 8 feet to about 12 feet, and a cab portion height E of from about 2 feet to about 3 feet.

Figure 14:
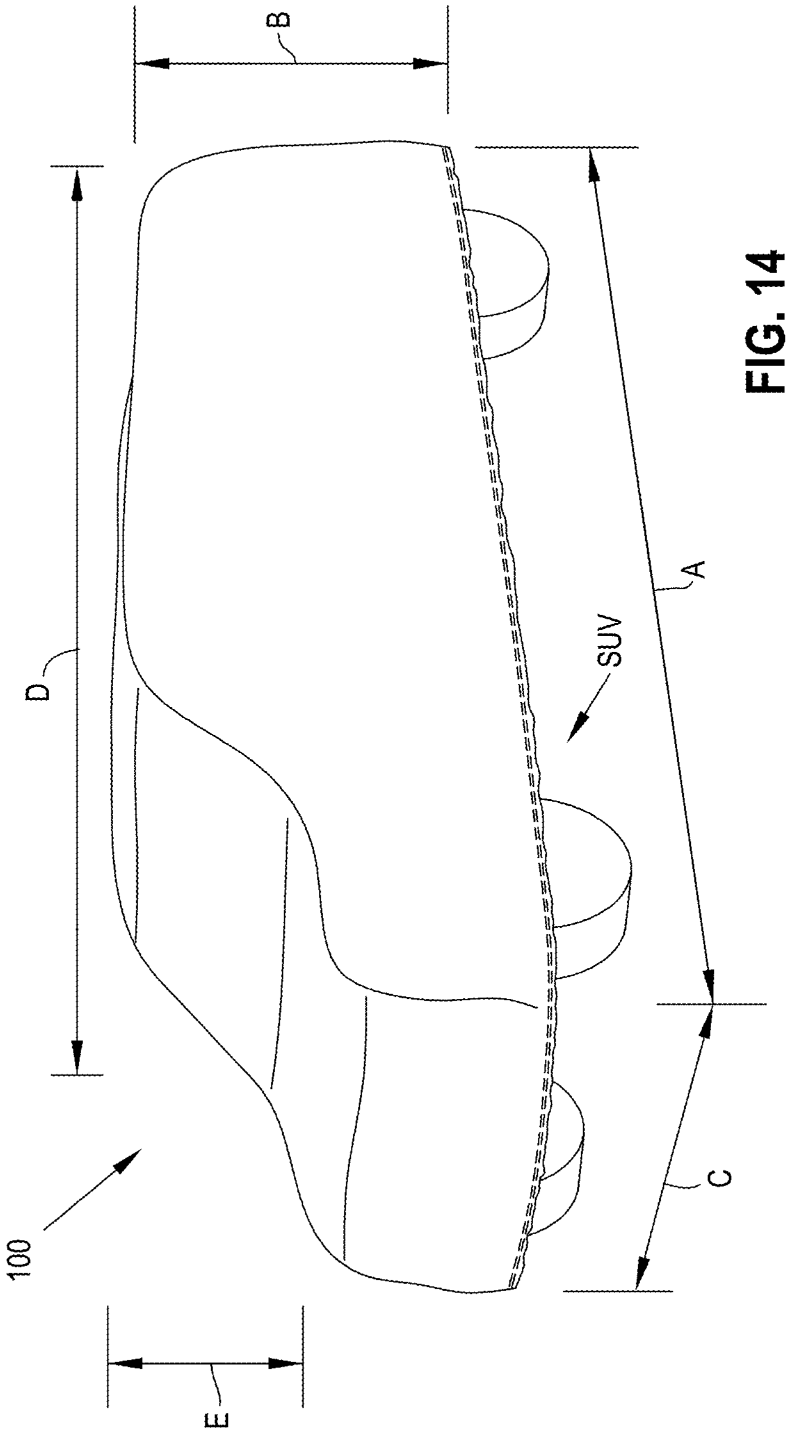
FIG. 14 is a perspective view of a security cover disposed over an exemplary sport utility vehicle including representative dimension lines, according to selected embodiments of the current disclosure.

FIG. 14 presents a perspective view of a security cover 100 disposed over an exemplary sport utility vehicle SUV including representative dimension lines, according to selected embodiments of the current disclosure. In some embodiments, the security cover 100 for an exemplary sport utility vehicle SUV has a length A of from about 12 feet to about 20 feet, a height B of from about 4 feet to about 8 feet, and a width C of from about 6 feet to about 8 feet. As also shown in FIG. 13, in some embodiments, the security cover 100 for an exemplary sport utility vehicle SUV has a cab portion length D of from about 9 feet to about 15 feet, and a cab portion height E of from about 2 feet to about 4 feet.

Figure 15:
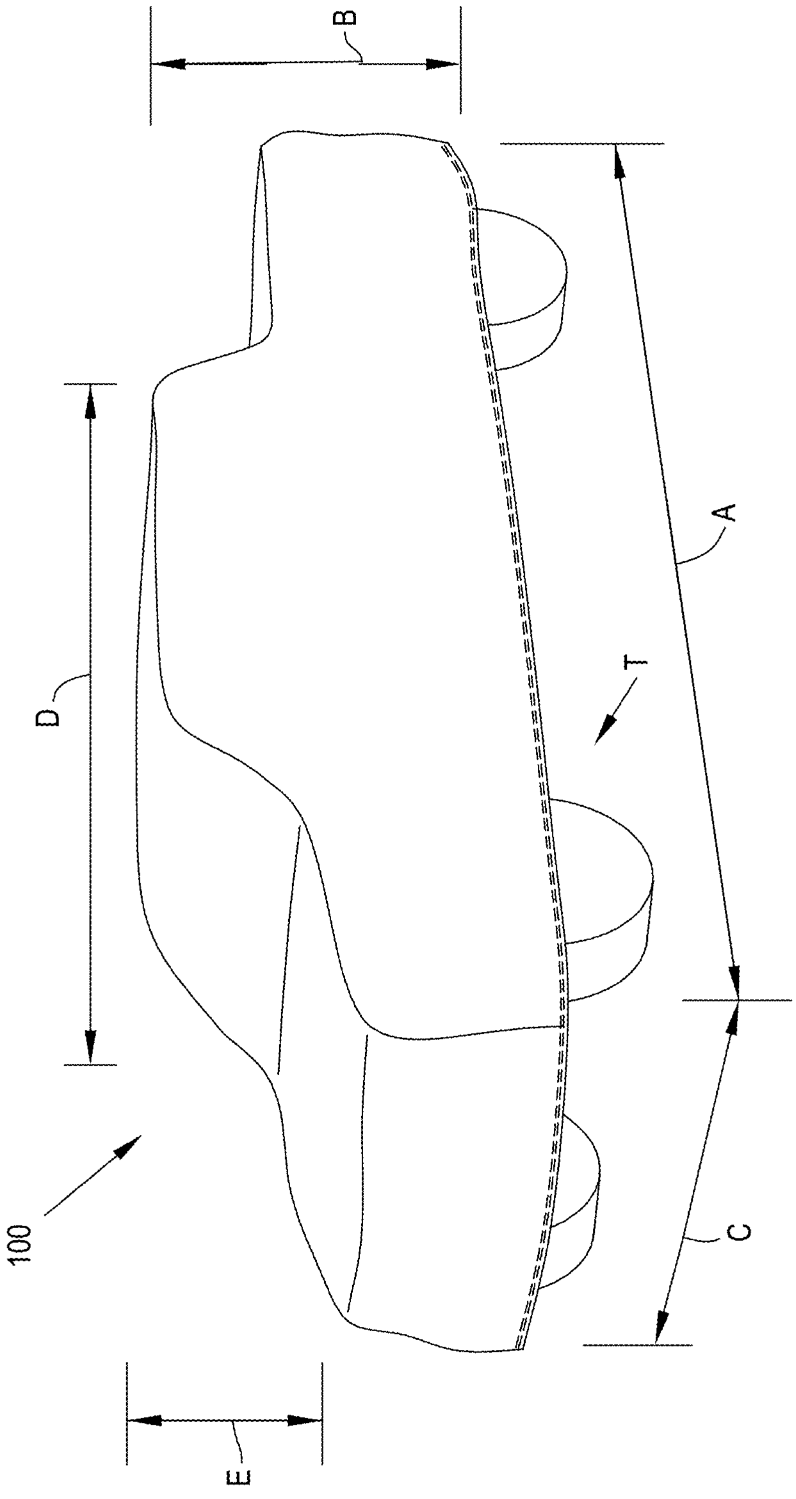
FIG. 15 is a perspective view of a security cover disposed over an exemplary pickup truck including representative dimension lines, according to selected embodiments of the current disclosure.

FIG. 15 is a perspective view of a security cover 100 disposed over an exemplary pickup truck T including representative dimension lines, according to selected embodiments of the current disclosure. In some embodiments, the security cover 100 for an exemplary pickup truck T has a length A of from about 16 feet to about 24 feet, a height B of from about 4 feet to about 8 feet, and a width C of from about 6 feet to about 8 feet. As also shown in FIG. 13, in some embodiments, the security cover 100 for an exemplary pickup truck T has a cab portion length D of from about 9 feet to about 15 feet, and a cab portion height E of from about 2 feet to about 4 feet.

In the foregoing description, it will be readily appreciated by those skilled in the art that modifications may be made to the invention without departing from the concepts disclosed herein. Such modifications are to be considered as included in the following claims unless the claims by their language expressly state otherwise.

Variations described for exemplary embodiments of the present invention can be realized in any combination desirable for each particular application. Thus, particular limitations, and/or embodiment enhancements described herein, which may have particular limitations, need be implemented in methods, systems, and/or apparatuses including one or more concepts describe with relation to exemplary embodiments of the present invention.

Therefore, it is intended that the invention not be limited to the particular embodiments disclosed as the best mode contemplated for carrying out this invention, but that the invention will include all embodiments falling within the scope of the present application as set forth in the following claims, wherein reference to an element in the singular, such as by use of the article "a" or "an" is not intended to mean "one and only one" unless specifically so stated, but rather "one or more." Moreover, no claim element is to be construed under the provisions of 35 U.S.C. § 112(f), unless the element is expressly recited using the phrase "means for" or "step for." These following claims should be construed to maintain the proper protection for the present invention.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, where this document refers to technologies that would be apparent or known to one of ordinary skill in the art, such technologies encompass those apparent or known to the skilled artisan now or at any time in the future. Furthermore, the use of plurals can also refer to the singular, including without limitation when a term refers to one or more of a particular item; likewise, the use of a singular term can also include the plural, unless the context dictates otherwise.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features of the present disclosure. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present invention should not be limited by any of the above-described exemplary embodiments.

What is claimed is:

1. A security cover configured to be disposed in an overlying relation to a vehicle, said security cover comprising:

a cover assembly including a cover defining a vehicle enclosure;

said cover assembly including a cable disposed around a lower perimeter of said cover;

said cover assembly including a lock disposed in a lock compartment, said lock having a lock body and a hasp disposable between a locked orientation and an unlocked orientation;

one end of said cable is secured to said lock body and an opposite end of said cable is releasably securable to said lock by said hasp while said hasp is disposed in said locked orientation;

said cover assembly including a global positioning system having a global positioning unit disposed in a global positioning unit compartment;

said cover assembly including a power source disposed in an electrically communicative relation with said lock and said global positioning unit; and a control application remotely communicative and operative with said lock and said global positioning unit.

2. The security cover of claim 1, wherein said cover comprises a multi-layered construction comprising an outer layer and an inner layer, and an intermediate layer disposed therebetween.

3. The security cover of claim 2, wherein said outer layer comprises a water-resistant polyester fabric, a hydrophobic polymer, or a combination thereof.

4. The security cover of claim 2, wherein said inner layer comprises a natural or synthetic fleece, a microfiber fabric, or a combination thereof.

5. The security cover of claim 2, wherein said intermediate layer comprises a cushioning material formed of a thermoplastic polyurethane or a closed-cell polyethylene having a plurality of generally hexagonal shaped sealed air filled cells disposed in a three-dimensional honeycomb array.

6. The security cover of claim 1, wherein said vehicle enclosure is dimensioned and configured to receive one of a car, a truck, a sport utility vehicle or a van therein.

7. The security cover of claim 1, wherein said cover assembly includes a biasing mechanism disposed proximate said lower perimeter of said cover, said biasing mechanism configured to pull one or more portions of said cover under a chassis of the vehicle while said security cover is disposed thereon.

8. The security cover of claim 1, wherein said cover assembly includes an anchor device having an anchor member affixed to said cover proximate said lower perimeter thereof, said anchor member releasably attachable to a portion of a chassis of the vehicle to hold said security cover in position on the vehicle while said security cover is disposed thereon.

9. The security cover of claim 1, wherein said cover assembly includes a cable retention channel disposed proximate said lower perimeter of said cover, said cable extending through said cable retention channel.

10. The security cover of claim 9, wherein said cable retention channel includes oppositely disposed open ends each communicative with a different one of oppositely disposed cable apertures through said lock compartment.

11. The security cover of claim 10, wherein said one end of said cable is secured to said lock body via a cable interconnect.

12. The security cover of claim 10, wherein said opposite end of said cable includes a lock interconnect dimensioned and configured to receive said hasp of said lock therethrough such that said opposite end of said cable is releasably securable to said lock by said hasp while said hasp is disposed in said locked orientation.

13. The security cover of claim 1, wherein said lock comprises a lock transceiver communicative with said control application, said lock transceiver configured to transmit a lock status signal to said control application which displays a lock status on a lock display of said control application.

14. The security cover of claim 13, wherein said lock comprises a tamper sensor disposed in communication with said lock transceiver and configured to detect a predetermined movement of said lock and to generate a temper alert signal upon detection thereof, said lock transceiver configured to transmit said tamper alert signal to said control application which displays a tamper alert on said lock display of said control application.

15. The security cover of claim 1, wherein said global positioning unit comprises a global positioning unit transceiver communicative with said control application, said global positioning unit transceiver configured to transmit a location signal to said control application which displays a location map having a location indicator on a global positioning system display of said control application, said location indicator corresponding to a location of said global positioning unit.

16. The security cover of claim 1, wherein said power source comprises a power source transceiver communicative with said control application, said power source transceiver configured to transmit a power source status signal to said control application which displays a power source status on a power source display of said control application.

17. The security cover of claim 1, wherein said power source comprises a solar collector.

18. The security cover of claim 1, wherein said cover includes an indicia display region having an indicia disposed therein.

19. A security cover configured to be disposed in an overlying relation to a vehicle, said security cover comprising:

a cover assembly including a cover comprising a multi-layered construction including:
  an outer layer formed of a water-resistant polyester fabric, a hydrophobic polymer, or a combination thereof,
  an inner layer formed of a natural or synthetic fleece, a microfiber fabric, or a combination thereof; and
  an intermediate layer comprising a cushioning material disposed therebetween, said cushioning material includes a plurality of generally hexagonal shaped sealed air filled cells, formed of a thermoplastic polyurethane or a closed-cell polyethylene, disposed in a three-dimensional honeycomb array; and
a cable disposed substantially around and along a lower perimeter of said cover;
a lock in a lock compartment of said cover assembly having a lock body and a hasp disposable between a locked orientation and an unlocked orientation;
one end of said cable is secured to said lock body and an opposite end of said cable is releasably securable to said lock by said hasp while said hasp is disposed in said locked orientation;
an anchor device having an anchor member affixed to said cover proximate said lower perimeter thereof, said anchor member releasably attachable to a portion of a chassis of the vehicle to hold said security cover in position on the vehicle; and
a global positioning unit disposed in a global positioning unit compartment of said cover assembly.

20. A security cover configured to be disposed in an overlying relation to a vehicle, said security cover comprising:

a cover assembly including a cover defining a vehicle enclosure accessible through an enclosure opening delineated by a lower perimeter of said cover;
said cover assembly including a cable disposed around said lower perimeter of said cover, said cable having a fixed end and a free end;
said cover assembly includes a cable retention channel disposed proximate said lower perimeter of said cover, said cable extending through said cable retention channel;
said cover assembly including a lock and a lock compartment dimensioned and configured to receive said lock therein, said lock having a lock body and a hasp disposable between a locked orientation and an unlocked orientation;
said fixed end of said cable is secured to said lock body and said free end of said cable is releasably securable to said lock by said hasp while said hasp is disposed in said locked orientation;
a control application supported on a portable electronic device is remotely communicative and operative with said lock;
said lock comprises a lock transceiver communicative with said control application and configured to transmit a lock status signal to said control application which displays a lock status on a lock display of said control application on the portable electronic device;
said lock comprises a tamper sensor disposed in communication with said lock transceiver and configured to detect a predetermined movement of said lock and to generate a temper alert signal upon detection thereof, said lock transceiver configured to transmit said tamper alert signal to said control application which displays a tamper alert on said lock display of said control application on the portable electronic device;
said cover assembly including a global positioning system having a global positioning unit and a global positioning unit compartment dimensioned and configured to receive said global positioning unit therein, said global positioning unit comprises a global positioning unit transceiver communicative with said control application and configured to transmit a location signal to said control application which displays a location map having a location indicator on a global positioning system display of said control application on the portable electronic device, said location indicator corresponding to a location of said global positioning unit; and
said cover assembly including a solar collector disposed in an electrically communicative relation with said lock and said global positioning unit to supply electrical power for operation thereof.

* * * * *